C. A. FLEMING.
FORK.
APPLICATION FILED JUNE 1, 1911.

1,091,319.

Patented Mar. 24, 1914.

Witnesses
Geo. Ackman Jr.
C. C. Hines

Inventor
Clifford A. Fleming
By Bennett T. June Atty.

UNITED STATES PATENT OFFICE.

CLIFFORD A. FLEMING, OF HUNTSVILLE, MISSOURI.

FORK.

1,091,319.  Specification of Letters Patent. Patented Mar. 24, 1914.

Application filed June 1, 1911. Serial No. 630,549.

*To all whom it may concern:*

Be it known that I, CLIFFORD A. FLEMING, a citizen of the United States, residing at Huntsville, in the county of Randolph and State of Missouri, have invented certain new and useful Improvements in Forks, of which the following is a specification.

This invention relates to forks, and particularly to that class of fork shown in my Patent No. 860,205, of July 16, 1907, and has for its primary object the provision of retaining mechanism movably supported by the fork frame and including means whereby it will be automatically rendered operative to a positive retention of the load during the operation of depositing the load on the fork.

With these and other ends in view which will readily appear as the nature of the invention is better understood, the same consists in the improved construction and novel arrangement and combination of parts which will be hereinafter fully described, and particularly pointed out in the claims.
In the accompanying drawings has been illustrated a simple and preferred form of the invention; it being, however, understood that no limitation is necessarily made to the precise structural details therein exhibited, but that changes, alterations and modifications within the scope of the invention may be resorted to, when desired.

Figure 1:
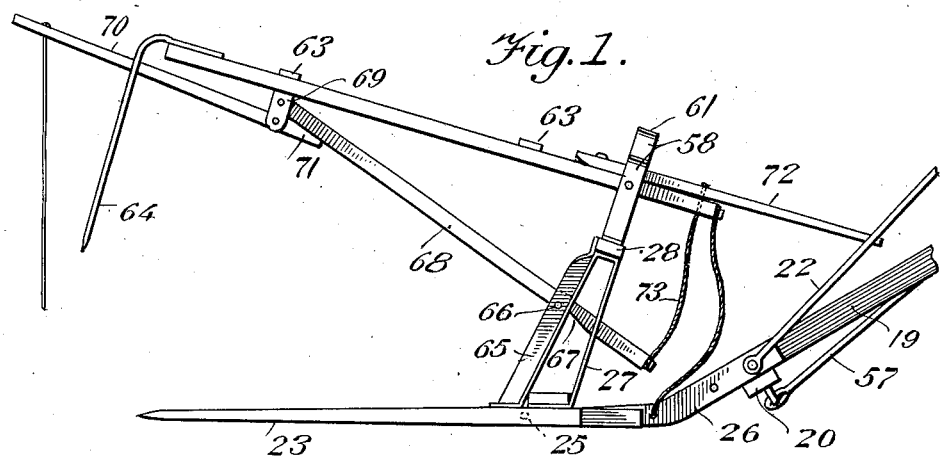
Figure 2:
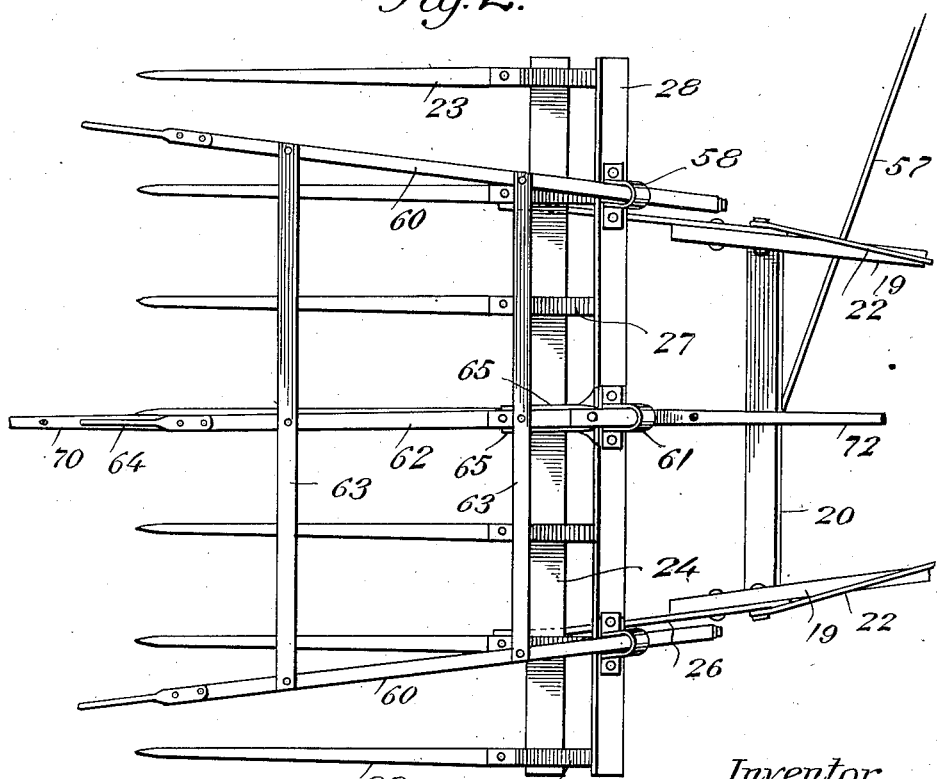

In the drawings: Figure 1 is a side view of the fork showing the device in a position to effectively grasp and engage the load when the latter is deposited on the fork. Fig. 2 is a top plan view thereof.

The fork is composed of a plurality of teeth or tines 23 secured upon and connected by the cross-head 24, two of the teeth being pivoted, at 25, to the angle plates 26 of the arms 19. The teeth or tines are provided with inclined inverted U-shaped guards 27, connected by a cross-bar 28, and serving to prevent the load from sliding forwardly of the fork-platform when the device is in operation.

It will be understood that the radius rod or rope 57 operates in connection with the bar 54 as a restraining and controlling element by which the fork lever when raised is also caused to swing laterally, and that by adjusting said bar 54 on the guide 50 the working elevation of the fork and its plane of lateral swinging movement may be regulated and varied.

Standards 58 of substantially U-form are secured to the bar 28 of the fork and pivoted therebetween, at 59, are the side members 60. An intermediate standard 61 is also secured to the bar 28 and pivoted thereto is the intermediate member 62. The members 60 and 62 are securely connected together by horizontal brace bars 63. The forward ends of the members 60 and 62 extend beyond the rear brace bar 63 and secured thereto are the downwardly extending tines 64 which are adapted to pierce the load of hay placed on the fork. Spaced plates 65 are connected at their rear ends to the central tooth of the fork, the front ends of said plates being secured to the bar 28. A latch pin 66 extends horizontally between the plates 65 and is adapted to fit in the notch 67 adjacent to the forward end of the latch member 68. The rear end of the latch member is pivoted in the yoke bracket 69 which depends from the central member 62. The bracket 69 extends below the plane of the rear end of the latch member and pivoted to such downwardly extending portion is a releasing lever 70, the forward end of the lever having a beveled nose or surface 71 which normally engages beneath the latch member in advance of the pivot of the member as shown, so that when the controlling end of the lever is depressed normally, the latch member will be relieved from the latch pin 66. With a view of permitting the latch member to be released from the front, I provide the central member 62 with a pivoted lever 72, the same having direct connection with the rear end of the latch member through the medium of the cable or chain 73. The lever 72 extends through the standard 61 and rearwardly thereof it is provided with a beveled surface 74 which may be brought into effective contact with the member 62 when the controlling end of the lever is actuated to exert the required pull upon the cable 73 to release the latch member. The frame formed by the members 60, 62, 63 and the tines 64 constitutes a rake-off and load retaining device which is somewhat similar to the one fully described in my patent hereinbefore mentioned. For the purpose of guiding the lever 70, I provide the same with a passage 75 which receives the central tine 64.

I claim:

1. A fork, locking means thereon, an overhanging frame movably mounted on said fork and provided with retaining devices for body movement through the load and operable to hold the load in position on the fork, and a holding member carried by said frame and inclined downwardly and rearwardly therefrom and detachably connected with the locking means on said fork and coöperating therewith to hold the frame and fork in opened positions prior to the deposit of the load on the fork and subsequently actuated by the load to permit operative closing movement of said fork and frame.

2. A fork, locking means thereon, an overhanging frame movably mounted on said fork and provided with retaining devices for body movement through the load and operable to hold the load in position on the fork, a holding member carried by said frame and inclined downwardly and rearwardly therefrom and detachably connected with the locking means on said fork and coöperating therewith to hold the frame and fork in opened positions prior to the deposit of the load on the fork and subsequently actuated by the load to permit operative closing movement of said fork and frame, and a tilting lever operatively connected with said member for manually releasing the same from said locking means.

3. A fork comprising a head, tines extending therefrom, guards rising from the tines at the rear ends thereof, a bar connected with said guards, members pivoted to said bar and overlying the tines, means carried by said members for engaging the load when said members are moved in the direction of the tines, devices connecting said members together, a keeper on the fork, and a load-actuated latch carried by one of said members and normally engaging the keeper to hold the load-engaging means on said members in inactive positions.

In testimony whereof I affix my signature in presence of two witnesses.

CLIFFORD A. FLEMING.

Witnesses:
W. L. DAMERON,
JIM L. HAMNETT.

---

Copies of this patent may be obtained for five cents each, by addressing the "Commissioner of Patents, Washington, D. C."